No. 851,292. PATENTED APR. 23, 1907.
J. V. KAPP.
BENCH PIN.
APPLICATION FILED APR. 27, 1906.
2 SHEETS—SHEET 2.
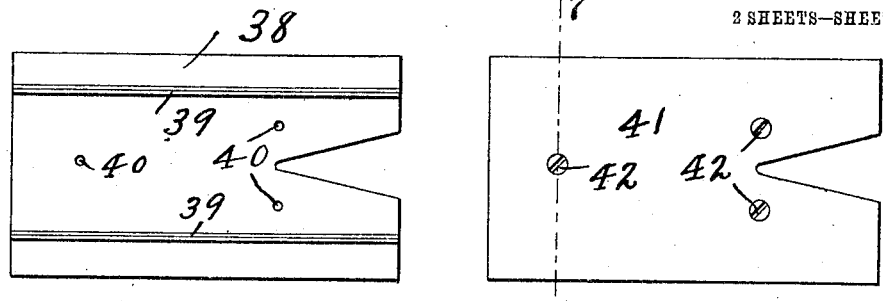
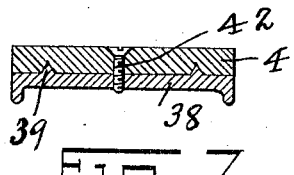
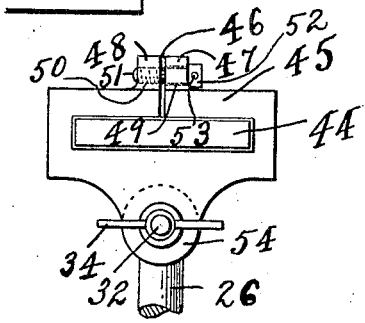
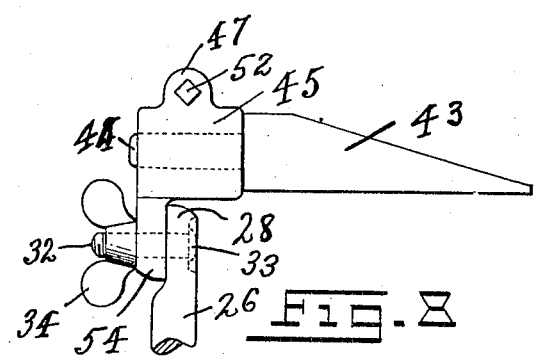
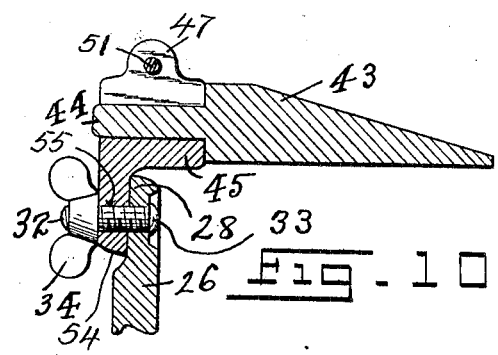
WITNESSES:
F. H. W. Fraentzel
Frederick Jamison
INVENTOR:
Joseph V. Kapp,
BY
Fred L. Fraentzel.
ATTORNEY

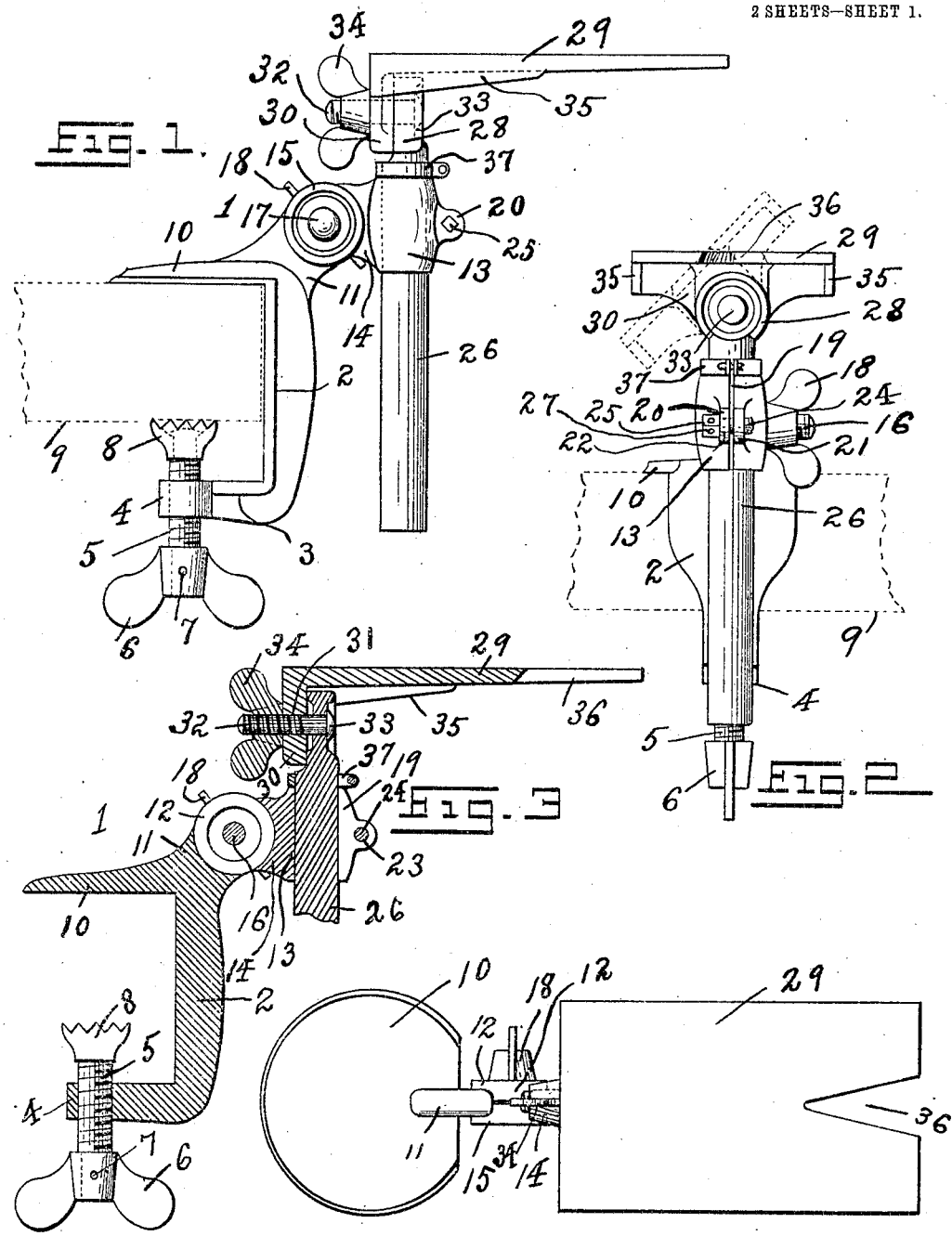

UNITED STATES PATENT OFFICE.

JOSEPH V. KAPP, OF NEWARK, NEW JERSEY.

BENCH-PIN.

No. 851,292.      Specification of Letters Patent.      Patented April 23, 1907.

Application filed April 27, 1906. Serial No. 313,910.

*To all whom it may concern:*

Be it known that I, JOSEPH V. KAPP, a citizen of the United States, residing at Newark, in the county of Essex and State of New Jersey, have invented certain new and useful Improvements in Bench-Pins; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The present invention has reference to improvements in bench-pins, for use in toolmaker's, jeweler's, and similar arts; and the invention has reference, more particularly, to a novel construction of bench-pin which is universal in its action thereby providing a table upon which the work to be operated upon can be held, the said table being capable of adjustment in any desired angle or plane.

The present invention, therefore, has for its principal objects to provide a simple, inexpensive, and efficient construction of bench-pin, the table of which may be secured with its plane at any desired angle of rotation about a horizontal axis; and a further object of the present invention is to provide a bench-pin which may be readily and quickly attached to or detached from the work-bench or table of the artisan, and which by reason of the varied adjustment of position of which it is capable, affords a most convenient place upon which to hold or secure a die, tool, piece of jewelry, or the like, which the artisan is working upon or making; and, furthermore, the present invention provides a bench-pin which may be used with economy of time and a saving of labor in doing a variety of work where a bench-pin is serviceable.

The invention consists, primarily, in the novel construction of bench-pin hereinafter more fully set forth, as well as in the various novel arrangements and combinations of the parts thereof, all of which will be more particularly described in the following specification, and then finally embodied in the clauses of the claims, which are appended to and which form an essential part of this specification.

The invention is clearly illustrated in the accompanying drawings, in which:—

Figure 1 is a side elevation of the bench-pin embodying the principles of the present invention, the said bench-pin being illustrated in its operative relation with a work bench or table, the said work-bench or table being indicated by dotted lines. Fig. 2 is a front elevation of the same, the work-bench or table being indicated by dotted lines. Fig. 3 is a central vertical section of the bench-pin embodying the principles of the present invention. Fig. 4 is a top or plan view of the same. Fig. 5 is a top or plan view of a modified form of table for a bench-pin embodying the principles of the present invention, being constructed in such form that a covering or sheath of wood or similar material may be secured thereto. Fig. 6 is a top or plan view of said modified form of table for bench-pin illustrated in Fig. 5, the covering or sheath of wood or similar material being secured thereto. Fig. 7 is a vertical cross-section of the same, taken on line 7—7 in said Fig. 6, looking in the direction of the arrow X. Fig. 8 is a side elevation of another modified form of table for bench-pin embodying the principles of the present invention. Fig. 9 is a back view of the same; and Fig. 10 is a central vertical section of the same.

Similar characters of reference are employed in all of the said hereinabove-described views to indicate corresponding parts.

Referring now to the several figures of the drawings, the reference-character 1 indicates the complete construction of the bench-pin, comprising a clamp-bracket 2, provided at its lower end with a right-angled extension 3 upon the end of which is formed integrally with the said extension 3, a screw-threaded nut 4, the said screw-threaded nut being adapted to receive the clamp-screw 5, and said clamp screw 5 being provided at the lower end with a winged finger-piece 6 secured to the said clamp-screw by means of a pin 7. The upper end of the said clamp-screw 5 is provided with a ratchet-toothed head 8 connected thereto in such a manner that the said ratchet-toothed head 8 will swivel thereon. The said ratchet-toothed head 8 is adapted to engage with the under side of a work-bench or table 9 to operatively secure the bench-pin 1 thereto. The said clamp-bracket 2 is furthermore provided at its upper end with a right-angled extension 10 preferably of circular conformation, as shown, this said right-angled extension 10 forming the upper jaw of a clamp which secures the said bench-pin 1 to a workbench or table 9.

Extending in an upward direction from the upper end of the clamp-bracket 2 is a lug or ear 11 provided at its outer end with a perforated disc 12. Pivotally connected to the said lug or ear 11 of the clamp-bracket 2 is a receiving socket 13 which is provided with an outwardly extending lug or ear 14 having upon its outer end a perforated disc 15. The said perforated disc 15 is held in pivotal relation with said perforated disc 12 of the lug or ear 11 upon the clamp-bracket 2, by means of a screw-threaded bolt 16 provided at one end with a head 17 and at the other with a winged nut 18, thus permitting the adjustment of the receiving-socket 13 to any desired angle in a vertical plane, as will readily be understood from an inspection of the accompanying drawings. The said receiving-socket 13 is split through one side, forming a longitudinal opening 19; and, the said receiving socket 13 is further provided with a pair of ears or lugs 20 and 21 respectively one on either side of the longitudinal opening 19, the said ear or lug 20 being provided with a perforation or hole 22, and the said ear or lug 21 being provided with a screw-threaded opening or hole 23. A bolt provided with a screw-threaded shank 24 and a head 25 passes through the perforation or hole 22 in the said lug or ear 20, and screws into the screw-threaded opening or hole 23, serving to draw the two halves of the receiving-socket 13 together and thereby lock or hold a shaft or rod 26 which rides within the receiving-socket 13, in any desirable position, by means of the friction between the inner sides of the receiving-socket 13 and the surface of the said shaft or rod 26. The head 25 of the bolt is provided with holes or openings 27 adapted to receive a pin or other tool to facilitate the turning the said bolt to tighten up the receiving-socket 13 for the purpose above mentioned.

The shaft or rod 26 is provided upon its upper end with a perforated disc 28 and pivotally secured to the said perforated disc 28, so as to be capable of a lateral movement, is the table 29 provided upon its rear portion with a downwardly extending lug or flange 30 said lug or flange being provided with a hole or opening 31 and being adapted to be brought in pivotally connected engagement with the said perforated disc 28 of the said shaft or rod 26, by means of a bolt comprising a screw-threaded shank 32 and a head 33, said screw-threaded shank 32 of said bolt extending through the perforation of the disc 28 and the hole or opening 31 of the lug or flange 30, and a winged nut 34 on said screw-threaded shank 32 being adapted to lock the said lug or flange 30 and the perforated disc 28 in any desired position, thereby providing an adjustment of the said table 29 with its plane at any angle of rotation about a horizontal axis, as will be readily understood from an inspection of the drawings. The said table 29 is further provided at each side thereof, and extending along the bottom or under side, with a pair of ribs 35 adapted to give strength to the said table 29, and the table 29 is further provided at its free end with a wedge-shaped opening 36 through which the artisan may insert the instrument or tool, such as a file or the like, while operating upon the piece of work held or strapped upon the said table 29.

The shaft or rod 26 is provided with a split collar 37 slidably arranged thereon and adapted to be set or tightened on the said shaft or rod 26, to mark the position to which the said shaft is to be raised or lowered, before the receiving socket 13 is tightened on the shaft or rod 26.

Referring now more particularly to Figs. 5 and 6 of the drawings, there is shown a slightly modified construction of table 38 for the bench-pin 1, the said table 38 being provided with a pair of longitudinally extending wedge-shaped ribs 39 and screw-holes 40 upon which is arranged a facing or sheathing of wood 41, or other suitable material, secured to the said table 38 by means of the screws 42, this said facing or sheathing of wood 41 providing a soft surface upon which fine work may be held with a minimum danger of scratching, abrading or otherwise injuring the same.

Referring now more particularly to Figs. 8, 9 and 10 of the drawings, there is shown a further modification of table for a bench-pin 1 comprising a table-block 43 made preferably of wood or similar material, said table-block 43 being provided with a rearwardly extending tongue 44, and said tongue 44 being adapted to be inserted in a receiving-socket or yoke 45 which is split through the upper side thereof to form an opening 46. The said receiving-socket or yoke 45 is further provided with a pair of ears or lugs 47 and 48, respectively, one on either side of the said opening 46, the said ear or lug 47 being provided with a perforation or hole 49 and the said ear or lug 48 being provided with a screw-threaded opening or hole 50. A bolt provided with a screw-threaded shank 51 and a head 52 passes through the said perforation or hole 44 in the said ear or lug 47 and screws into the said screw-threaded opening or hole 50, serving to draw the two halves of the receiving socket or yoke 45 together and thereby lock or hold the said rearwardly extending tongue 44 of the table block 43 therein. The head 52 of the bolt is provided with holes or openings 53 in which may be inserted a pin or other tool adapted to facilitate the tightening up of the same. The said securing socket or yoke 45 is furthermore provided with a downwardly extending lug 54 formed with a hole or perforation 55, and the said lug is adapted to be brought in pivotal connection with the perforated disc 28 of the said shaft or rod 26 in the same manner and by the same means previously described.

From the foregoing description and the accompanying drawings it will be readily understood that I have provided a novel construction of a bench-pin that is universal in its action, that is, that the table thereof may be secured with its plane at any angle of rotation about a horizontal axis, thereby providing a very convenient rest upon which to hold the delicate work and hence greatly aiding the artisan in the execution of that work.

I claim:—

1. In a bench-pin, the combination with a clamping means, consisting essentially of a clamp-bracket, a right-angled extension on the lower end of said clamp-bracket, a screw-threaded nut on said right-angled extension, a clamp-screw adapted to turn in the said screw-threaded nut, a ratchet-toothed head swivelly connected to the end of said clamp-screw and adapted to engage with the under side of a work bench or table, a winged nut secured upon the end of said clamp-screw to turn the same, a right-angled extension or clamp-jaw upon the upper end of said clamp bracket, adapted to engage with the upper side of a work-bench or table, a receiving socket pivotally connected with said clamping-means, means for setting and locking said receiving socket at any angle in a vertical plane, a shaft or rod slidably arranged within said receiving socket, means connected with said receiving-socket for locking the said shaft or rod at any desired elevation, a table pivotally connected with the upper end of the said shaft or rod, a wedge-shaped opening at the free end of said table, and means for securing the table with its plane at any angle of rotation about a horizontal axis, substantially as and for the purposes set forth.

2. In a bench-pin, the combination with a clamping means, consisting essentially of a clamp-bracket, a right-angled extension on the lower end of said clamp-bracket, a screw-threaded nut on said right-angled extension, a clamp-screw adapted to turn in the said screw-threaded nut, a ratchet-toothed head swivelly connected to the end of said clamp-screw and adapted to engage with the under side of a work-bench or table, a winged nut secured upon the end of said clamp-screw, to turn the same, a right-angled extension or clamp-jaw upon the upper end of said clamp-bracket, adapted to engage with the upper side of a work-bench or table, a receiving-socket pivotally connected with said clamping means, means for setting and locking said receiving-socket at any angle in a vertical plane, comprising an upwardly extending lug or ear upon said clamping means provided at its outer end with a perforated disc, a lug or ear extending from said receiving-socket, and a perforated disc upon the outer end of said lug or ear of the said receiving-socket, a screw-threaded bolt provided with a head at one end and a winged nut at the other, to pivotally connect the perforated disc on the end of the lug or ear of the receiving-socket, a shaft or rod slidably arranged within the said receiving-socket, a pair of lugs on said receiving-socket having a space between them, a bolt provided with a screw-threaded shank and a head, said bolt being adapted to operatively engage with the said pair of lugs to draw the same together to lock the said shaft or rod at any desired elevation, a table pivotally connected with the upper end of said shaft or rod, said table having a wedge-shaped opening at its free end, and means for securing the table with its plane at any angle of rotation about a horizontal axis, substantially as and for the purposes set forth.

3. In a bench-pin, the combination with a clamping means, consisting essentially of a clamp-bracket, a right-angled extension on the lower end of said clamp-bracket, a screw-threaded nut on said right-angled extension, a clamp-screw adapted to turn in the said screw-threaded nut, a ratchet-toothed head swivelly connected to the end of said clamp-screw and adapted to engage with the under side of a work-bench or table, a winged nut secured upon the end of said clamp-screw to turn the same, a right-angled extension or clamp-jaw upon the upper end of said clamp-bracket, adapted to engage with the upper side of a work-bench or table, a receiving socket pivotally connected with said clamping-means, means for setting and locking said receiving-socket at any angle in a vertical plane, comprising an upwardly extending lug or ear upon said clamping-means provided at the outer end with a perforated disc, a lug or ear extending from said receiving-socket, and a perforated disc upon the outer end of said lug or ear of the said receiving socket, a screw-threaded bolt provided with a head at one end and a winged nut at the other, to pivotally connect the perforated disc on the end of the lug or ear of the clamping means with the perforated disc on the end of a lug or ear of the receiving socket, a shaft or rod slidably arranged within the said receiving socket, a pair of lugs on said receiving socket having a space between them, a bolt provided with a screw-threaded shank and a head, said bolt being adapted to operatively engage with the said pair of lugs to draw the same together to lock the said shaft or rod at any desired elevation, a table pivotally connected with the upper end of said shaft or rod, said table having a wedge-shaped opening at the free end thereof, and means for securing the table with its plane at any angle of rotation about a horizontal axis, comprising a perforated disc on the upper end of said shaft or rod, a downwardly extending lug or flange provided with a hole or opening, on the rear end of said table, a screw-threaded bolt provided with a head at one end and a winged nut at the other end to pivotally connect the perforated disc on the end of the said shaft or rod with the downwardly extending lug upon the rear of the said table, a split collar arranged upon said shaft or rod to mark the elevation at which the said shaft or rod is to be set, and means to tighten said split-collar upon the said shaft or rod, substantially as and for the purposes set forth.

4. In a bench-pin, the combination with a clamping means, adapted to secure the said bench-pin to a work-bench or table, a receiving socket pivotally connected with the said clamping means, and means for setting or locking the said receiving socket at any desired angle in a vertical plane, a shaft or rod slidably arranged within said receiving-socket, and means connected with the said receiving socket for locking the said shaft or rod at any desired elevation, a table pivotally connected with the upper end of said shaft or rod, said table being provided with a wedge-shaped opening at its free end, means for securing the table with its plane at any angle of rotation about a horizontal axis, and means for securing upon the upper face of said table a facing, substantially as and for the purposes set forth.

5. In a bench-pin, the combination with a clamping means, adapted to secure the said bench-pin to a work-bench or table, a receiving socket pivotally connected with the said clamping means, and means for setting the said receiving socket at any desired angle in a vertical plane, a shaft or rod slidably arranged within said receiving socket, and means connected with the said receiving socket for locking the said shaft or rod at any desired elevation, a table pivotally connected with the upper end of said shaft or rod, said table being provided with a wedge-shaped opening at its free end, means for securing the table with its plane at any angle of rotation about a horizontal axis, means for securing upon the upper face of said table a facing, consisting essentially of a pair of wedge-shaped ribs extending longitudinally across the face of the said table, suitably disposed screw-holes in the face of said table and screws for securing the facing or sheathing of wood or similar material thereto, substantially as and for the purposes set forth.

6. In a bench-pin, the combination with a clamping means, adapted to secure the said bench-pin to a work-bench or table, a receiving socket pivotally connected with the said clamping means, and means for setting the said receiving socket at any desired angle in a vertical plane, a shaft or rod slidably arranged within said receiving socket, and means connected with the said receiving socket for locking the said shaft or rod at any desired elevation, a table pivotally connected with the upper end of said shaft or rod, means for securing the table with its plane at any angle of rotation about a horizontal axis, said table comprising a table-block, provided with a rearwardly extending tongue, a yoke adapted to receive the rearwardly extending tongue of the said table-block, and means for securing the said rearwardly extending tongue of the said table-block within the said yoke, substantially as and for the purposes set forth.

7. In a bench-pin, the combination with a clamping means, adapted to secure the said bench-pin to a work-bench or table, a receiving socket pivotally connected with the said clamping means, and means for setting and locking the said receiving socket at any desired angle in a vertical plane, a shaft or rod slidably arranged within said receiving socket, and means connected with the said receiving socket for locking the said shaft or rod at any desired elevation, a table pivotally connected with the upper end of said shaft or rod, means for securing the table with its plane at any angle of rotation about a horizontal axis, said table comprising a table-block, provided with a rearwardly extending tongue, a yoke adapted to receive the rearwardly extending tongue of the said table block, and means for securing the said rearwardly extending tongue of the said table block within the said yoke, consisting, of a split portion on the upper side of the said yoke, a pair of ears or lugs, one on each side of the said split portion, and a bolt comprising a screw-threaded shank and a head, said screw-threaded shank being adapted to pass through one lug or ear and screw into the other lug or ear to draw together the said lugs or ears, and thus bind the said rearwardly extending tongue within the said yoke, substantially as and for the purposes set forth.

8. In a bench-pin, the combination with a clamping means, adapted to secure the said bench-pin to a work-bench or table, of a receiving socket, a hinged connection, adapted to pivotally connect the said receiving socket with the said clamping means, and means for locking the said hinged connection, after adjusting the said receiving socket at any desired angle in a vertical plane, a shaft or rod slidably arranged within said receiving socket, means for tightening said receiving socket around the said shaft or rod to hold the said rod at any desired elevation, a table provided with a wedge-shaped opening at the free end thereof, a hinged connection between said table and the upper end of the said shaft or rod, and means for locking the said hinged connection, after securing the table with its plane at any desired angle of rotation about a horizontal axis, substantially as and for the purposes set forth.

9. In a bench-pin, the combination with a clamping means adapted to secure the said bench-pin to a work-bench or table, of a receiving socket, a hinged connection adapted to pivotally connect the said receiving socket with the said clamping means, and means for locking the said hinged connection, after adjusting the said receiving socket at any desired angle in a vertical plane, a shaft or rod slidably arranged within said receiving socket, means for tightening said receiving socket around the said shaft or rod to hold the said shaft or rod at any desired elevation, a table provided with a wedge-shaped opening at the free end thereof, a hinged connection between said table and the upper end of the said shaft or rod, and means for locking the said hinged connection, after securing the table with its plane at any desired angle of rotation about a horizontal axis, a pair of wedge-shaped ribs extending longitudinally across the upper face of said table, screw-holes formed in said table, and a facing secured to the face of said table, substantially as and for the purposes set forth.

10. In a bench-pin, the combination with a clamping means, adapted to secure the said bench-pin to a work-bench or table, of a receiving socket, a hinged connection, adapted to pivotally connect the said receiving socket with the said clamping-means, and means for locking the said hinged connection, after adjusting the said receiving socket at any desired angle in a vertical plane, a shaft or rod slidably arranged within said receiving socket, means for tightening said receiving-socket around the said shaft or rod to hold the said shaft or rod at any desired elevation, a table provided with a wedge-shaped opening at the free end thereof, a hinged connection between said table and the upper end of the said shaft or rod, and means for locking the said hinged connection, after adjusting the said table at any desired angle in a horizontal plane, a pair of wedge-shaped ribs extending longitudinally across the upper face of said table, screw-holes formed in said table, and a facing secured to the face of said table, and a split collar slidably arranged on said shaft or rod, adapted to be tightened on the said shaft or rod to mark the position or elevation to which the said shaft or rod is to be adjusted, substantially as and for the purposes set forth.

11. In a bench-pin, the combination with a clamping means, adapted to secure the said bench pin to a work-bench or table, of a receiving socket, a hinged connection adapted to pivotally connect the said receiving socket with the said clamping means, and means for locking the said hinged connection, after adjusting the said receiving socket at any desired angle in a vertical plane, a shaft or rod slidably arranged within said receiving socket, means for tightening said receiving socket around the said shaft or rod, to hold the said shaft or rod at any desired elevation, a yoke, a hinged connection between said yoke and the upper end of said shaft or rod, and means for locking said hinged connection, a table-block provided with a rearwardly extending tongue adapted to be received and held by the yoke, and means connected with the said yoke for binding the said rearwardly extending tongue of the table-block therein, substantially as and for the purposes set forth.

12. In a bench-pin, the combination with a clamping means, adapted to secure the said bench-pin to a work-bench or table, of a receiving socket, a hinged connection, adapted to pivotally connect the said receiving socket with the said clamping-means, and means for locking the said hinged connection, after adjusting the said receiving socket at any desired angle in a vertical plane, a shaft or rod slidably arranged within said receiving socket, means for tightening said receiving socket around the said shaft or rod to hold the said shaft or rod in any desired elevation, a yoke, a hinged connection between said yoke and the upper end of said shaft or rod, and means for locking said hinged connection, a table-block provided with a rearwardly extending tongue adapted to be received and held by the yoke, and means connected with said yoke for binding or locking the said rearwardly extending tongue of the table-block therein, and a split collar slidably arranged on said shaft or rod, adapted to be tightened on the said shaft or rod to mark the position or elevation to which the said shaft or rod is to be adjusted, substantially as and for the purposes set forth.

In testimony, that I claim the invention set forth above I have hereunto set my hand this 23rd day of April, 1906.

JOSEPH V. KAPP.

Witnesses.
   GEO. D. RICHARDS,
   FREDERICK JAMISON.